Figure 1:
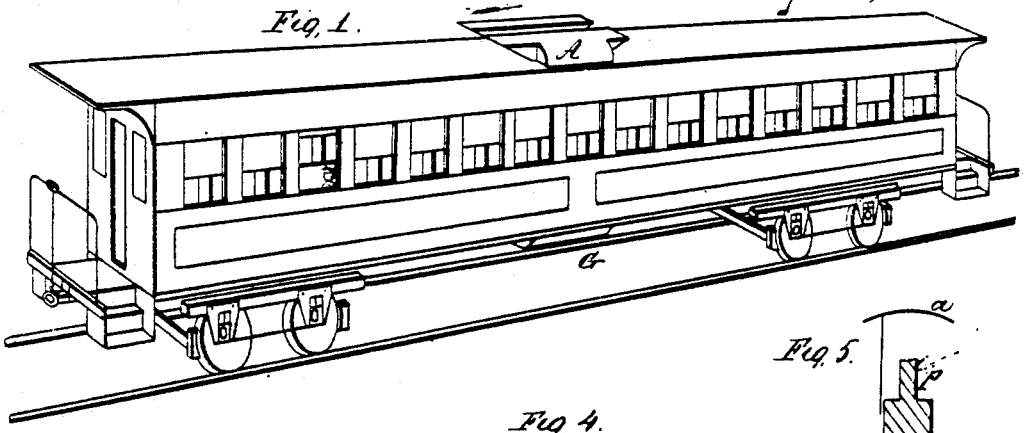
Figure 2:
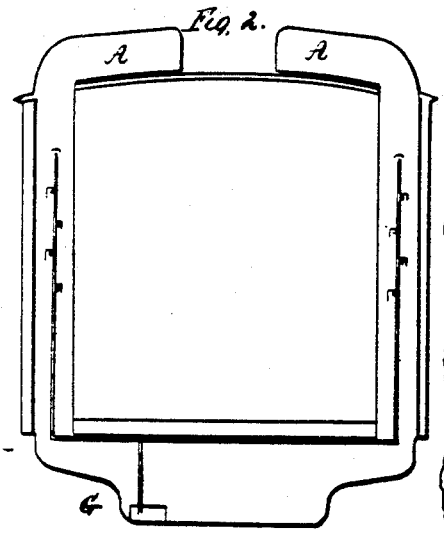
Figure 4:
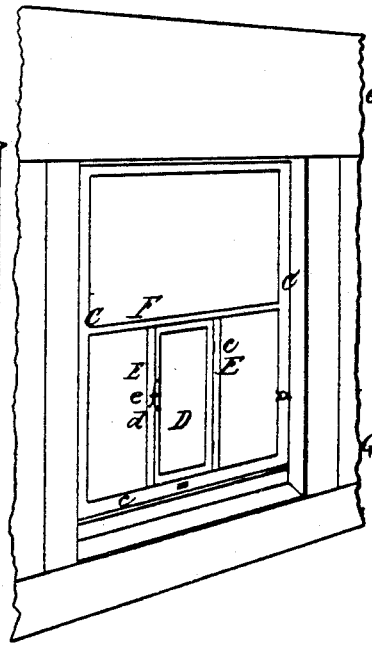
Figure 5:
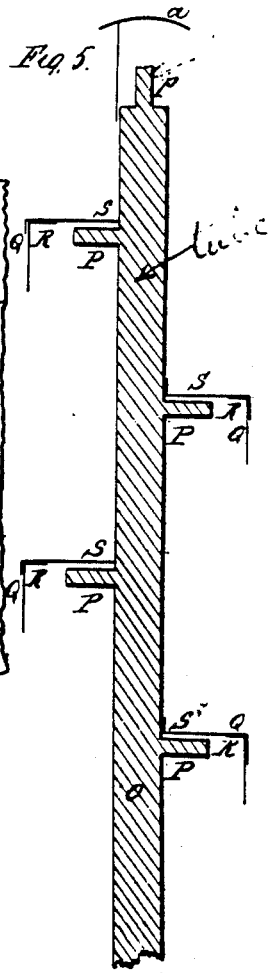
Figure 3:
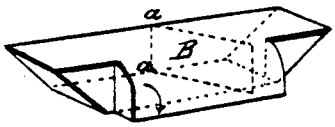

454-104 EX
M9563 OR AI 139

[redacted]

G. F. Foote,

BEST AVAILABLE COPY

Car Ventilator,

No. 139. A.I. Patented Apr. 8, 1856.

Witnesses;
O. M. Butts
N. Samuels

Inventor;
Geo. F. Foote

N. PETERS, PHOTO-LITHO., WASH., D. C.

"B" is a vertical swing valve to swing as the cars may run in either direction so as to deflect the air towards the opening below." H This differs from Fugard #11,268 wherein the valve hung vertically in the "Main Burners" like an ordinary door.

BEST AVAILABLE COPY

P and O are tubes to moisten the air. Water from these tubes impinges on discs Q.

What I claim is a small door that may be opened or shut in connection with and as part of a car window that may be raised or opened in the usual way.